(12) United States Patent
Ogburn

(10) Patent No.: US 6,187,177 B1
(45) Date of Patent: Feb. 13, 2001

(54) INDUSTRIAL FILTER

(76) Inventor: Scott E. Ogburn, 2655 Nesbit Trail, Alpharetta, GA (US) 30022

(*) Notice: Under 35 U.S.C. 154(b), the term of this patent shall be extended for 0 days.

(21) Appl. No.: 09/267,318

(22) Filed: Mar. 12, 1999

(51) Int. Cl.$^7$ .................................................. B01D 33/46
(52) U.S. Cl. .............................. 210/85; 210/90; 210/393; 210/396; 210/408; 210/413; 210/414; 210/415
(58) Field of Search ............................. 210/90, 107, 108, 210/393, 396, 408, 411, 413, 414, 415, 497.01, 85, 97

(56) References Cited

U.S. PATENT DOCUMENTS

| | | | |
|---|---|---|---|
| 716,989 | * 12/1902 | Davidson | 210/415 |
| 723,639 | * 3/1903 | Bliss | 210/415 |
| 795,047 | * 7/1905 | Lynn | 210/415 |
| 799,395 | * 9/1905 | Lynn | 210/415 |
| 950,118 | * 2/1910 | Rood | 210/415 |
| 2,202,191 | * 5/1940 | Cuno | 210/415 |
| 5,595,655 | * 1/1997 | Steiner et al. | 210/396 |
| 5,632,903 | * 5/1997 | Caracciolo | 210/415 |

* cited by examiner

*Primary Examiner*—Joseph W. Drodge
(74) *Attorney, Agent, or Firm*—Needle & Rosenberg, P.C.

(57) ABSTRACT

A filter unit for filtering pressurized liquid carrying solid contaminants, comprising a housing having a cavity, an unfiltered liquid inlet port, and a filtered liquid outlet port. The filter unit also has a filter element having a generally cylindrical shape positioned within the housing, an interior, and a porous filter sleeve having an exterior face, the interior of said filter element in fluid communication with the filtered liquid outlet port and the exterior face of the sleeve of said filter element in fluid communication with the unfiltered liquid, so that, in operation, unfiltered liquid carrying solid contaminants flows into the cavity of the housing through the unfiltered liquid inlet port, the filter element filters the solid contaminants from the liquid, and the filtered liquid passes through the sleeve of the filter element to the interior thereof before exiting the filter unit via the filtered liquid outlet port. A wiper unit overlying at least a portion of the exterior face of the filter sleeve of the filter element simultaneously rotates about the filter element for removal of filtered out accumulated solids from the at least a portion of the exterior face of the filter sleeve of the filter element.

38 Claims, 6 Drawing Sheets

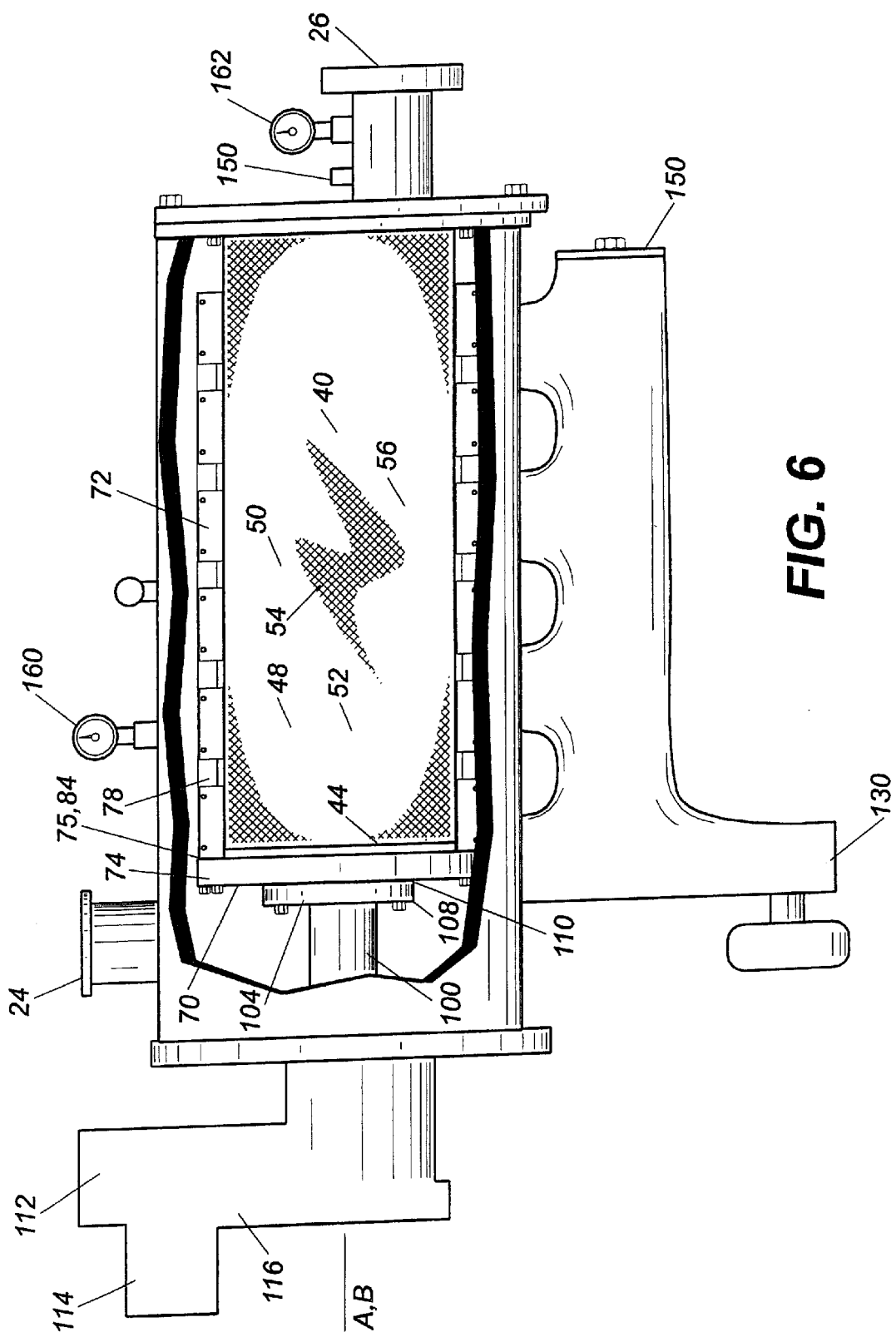

INDUSTRIAL FILTER

BACKGROUND OF THE INVENTION

1. Field of the Invention

The present invention relates to the filtering of fluids containing solid contaminants and, more particularly, to a high volume self-cleaning industrial pressure filter having a rotatable wiping member for cleansing the filter element of the filter.

2. Description of the Prior Art

Generally, filters have a wide variety of applications from waste water treatment to all types of industrial applications, such as petrochemical, food processing, and materials processing. Filters may be used whenever solid contaminants suspended in the unfiltered liquid may cause malfunction, damage, or must be removed for any other reason. In filters of this type, the fundamental problem is that when no suitable countermeasures are taken, the throughput of filtered liquid through the filter element is drastically reduced in that the filter element openings or apertures are continuously clogged on the inlet side of the filters by the solid contaminants contained in the unfiltered fluid. This problem is aggravated in pressure filters because the solid contaminants tend to be forced into and onto the filtering surface of the filter element and tend to cake over the filtering surface. To clean the filter element, the filter assembly generally requires extensive dismantling which results in a breakdown of operation and high maintenance costs.

Many methods and apparatuses have been used to attempt to self-clean the filter element in order to remove accumulated solid contaminants without the undesirable necessity of intermittent operational shutdowns of the filtering operation. For example, it is well know in the art to remove accumulated solids or sedimentation collected on the filter element during the filtering process by backwashing, in which a portion of the filtered liquid is caused to flow in a reverse direction through the filter element to clean the filter. More recently it has been recognized that the backwashing liquid may be supplied from an external source and at a pressure above the pressure of the fluid in the strainer. Exemplary of this is U.S. Pat. No. 3,074,560.

U.S. Pat. No. 3,357,566 shows a backwash filter having an inlet, a first outlet and a backwash outlet with a backwash arm having rubber edges defining a slot that engages the inside of the filter basket. The filter element is made of a plurality of vertically spaced rods. Similarly, U.S. Pat. No. 4,818,402 shows a backwashing filter having a fixed filter screen and a rotating backwashing apparatus for delivering high velocity liquid for backwashing the filter screen media.

It has also been known to provide a scraping shoe, which advances over the surface of a straining member and removes surface deposits of accumulated solid contaminants which are accumulated and immediately backwashed through a discharge. An example of such filters is shown in U.S. Pat. No. 2,275,958. Similarly, U.S. Pat. Nos. 5,198,111 and 5,569,383 disclose a cleaning unit that simultaneously moves both axially and rotatively along the interior of the filter element and carries a cleaning blade that moves in a conical helical path along the interior face of the filter element for removing accumulated solids.

While all of the above designs have useful applications, their designs are generally complex and typically have multiple seals that are prone to leakage and/or short seal life (which is especially aggravated when the unfiltered liquid is pressurized). Further, the filters heretofore designed and employed have been difficult to service due to the complexity of the design and the time required to separate the filter element from the cleaning components and to remove the cleaning components and the filter element from the housing of the filter.

SUMMARY OF THE INVENTION

Few improvements have been made in the reduction of the complexity of self-cleaning filters. The conventional methods and apparatus of prior art filters, or filter systems, for filtering solid contaminants suspended within unfiltered liquid are inadequate and require an inordinate amount of time and effort to separate the cleaning components and the filter element from each other and from the housing of the filter for routine maintenance and cleansing. This same complexity complicates the exchange of the filter element for one that has the appropriately sized filtering surface for the specific contaminated liquid to be filtered, which necessitates using the filter unit for one process type or application that will effectively work with the given porosity, or aperture size, of the specific filter element used or supplied by the manufacturer. The principal object of the present invention is to provide a pressure filter unit of the type described which is characterized by a compact design and a good aptitude for maintenance. Another objective of the present invention is to provide a pressure filter unit which has a high flow rate and good efficiency.

A further objective of the present invention is to provide a pressure filter unit having a filter element and wiper unit that can be easily removed from the filter housing for service or replacement. Yet another objective of the present invention is to provide a pressure filter unit having a filter element that has no mechanical seals between moving or movable components.

To achieve these and other advantages, and in accordance with the purpose of the invention, as embodied and broadly described, the present invention is directed to an industrial filter for filtering of fluids containing solid contaminants and, more particularly, to a high volume self-cleaning industrial pressure filter unit having a hollow housing having an unfiltered liquid inlet port and a filtered liquid outlet port. The housing contains a filter element of generally cylindrical shape which has a center longitudinal axis, an interior in fluid communication with the filtered liquid outlet port, and a porous sleeve having an exterior face in fluid communication with the unfiltered liquid for filtering suspended contaminant solids from the liquid. The sleeve of the filter element has a plurality of filter apertures in fluid communication with the interior of the filter element and the unfiltered fluid exterior to the filter element that are appropriately sized for the contaminant screening desired for the specified application. The housing may also have a contaminant outlet port in communication with the filtered contaminant solids for removal of filtered solids retained in the cavity of the housing. The filter unit may also have means for opening and closing the contaminant outlet port for removal of fluid carrying the accumulated filtered solid contaminants.

The filter unit also includes a wiping unit that overlies at least a portion of the exterior face of the sleeve of the filter element. The wiping unit has a wiper blade and a wiper unit longitudinal axis which is coincident and coaxial to the center longitudinal axis of the filter element. The filter unit further comprises means for rotating the wiping unit about the wiper unit longitudinal axis and the coaxial center longitudinal axis of the filter element so that the wiper blade is forced into scraping engagement with a portion of the exterior face of the sleeve for removal of filtered solid contaminants that may have accumulated on or caked onto the exterior face of the sleeve of the filter element. The filter unit may also have means for detecting the degree of contamination, or blockage, of the filtering apertures of the sleeve of the filter element.

The above and other objects and advantages of the present invention will become more readily apparent when reference is made to the following description taken in conjunction with the accompanying drawings.

BRIEF DESCRIPTION OF THE DRAWINGS

FIG. 6 is a partial cut-away side view of a filter element and a second embodiment of the wiping unit of the filter unit of the present invention.

DETAILED DESCRIPTION OF THE INVENTION

The present invention is more particularly described in the following examples that are intended as illustrative only since numerous modifications and variations therein will be apparent to those skilled in the art. As used in the specification and in the claims, "a" can mean one or more, depending on the context in which it is used.

Figure 1A:
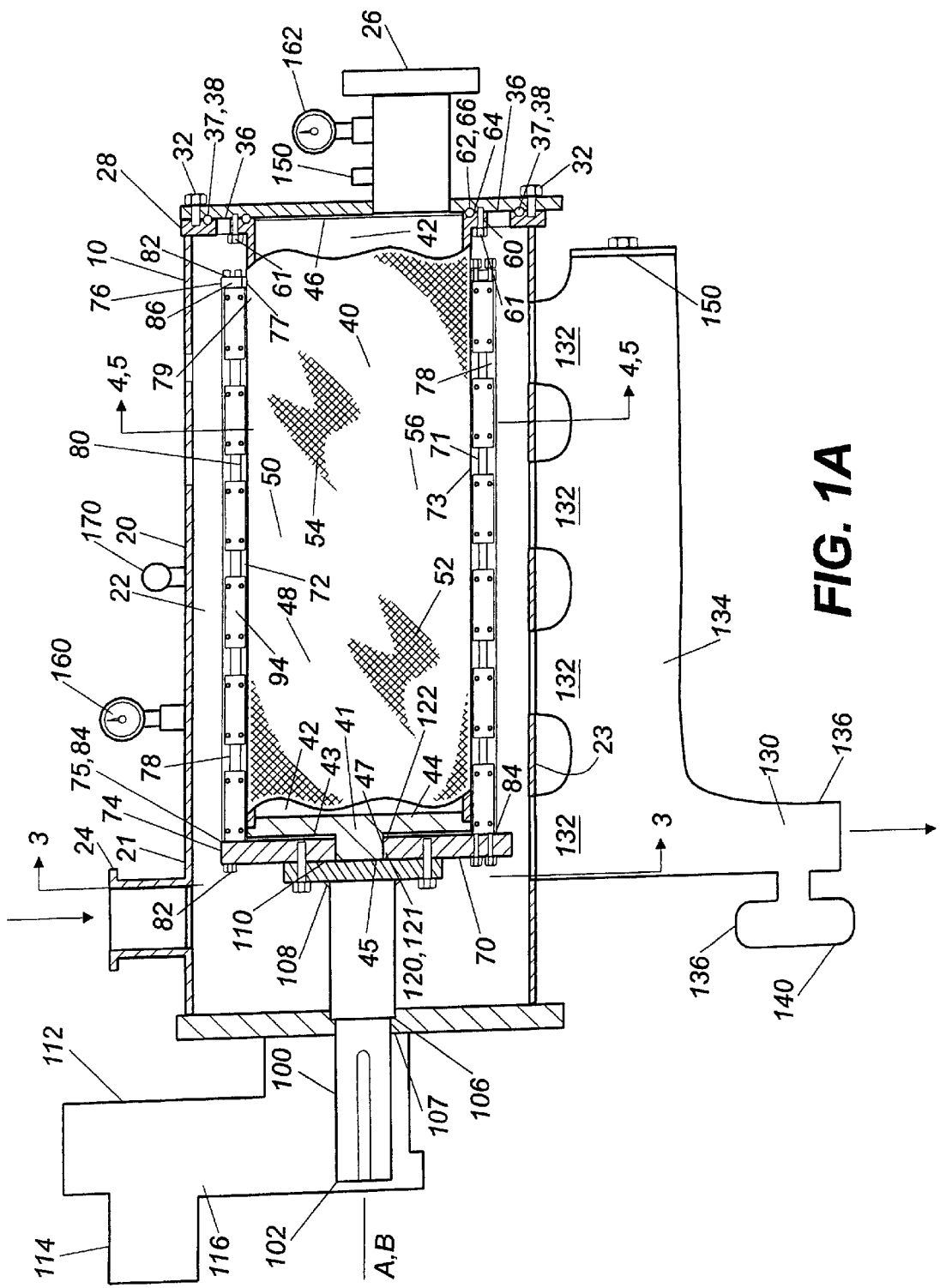
FIG. 1A is a longitudinal cross-sectional view of a filter unit according to the present invention.
Figure 1B:
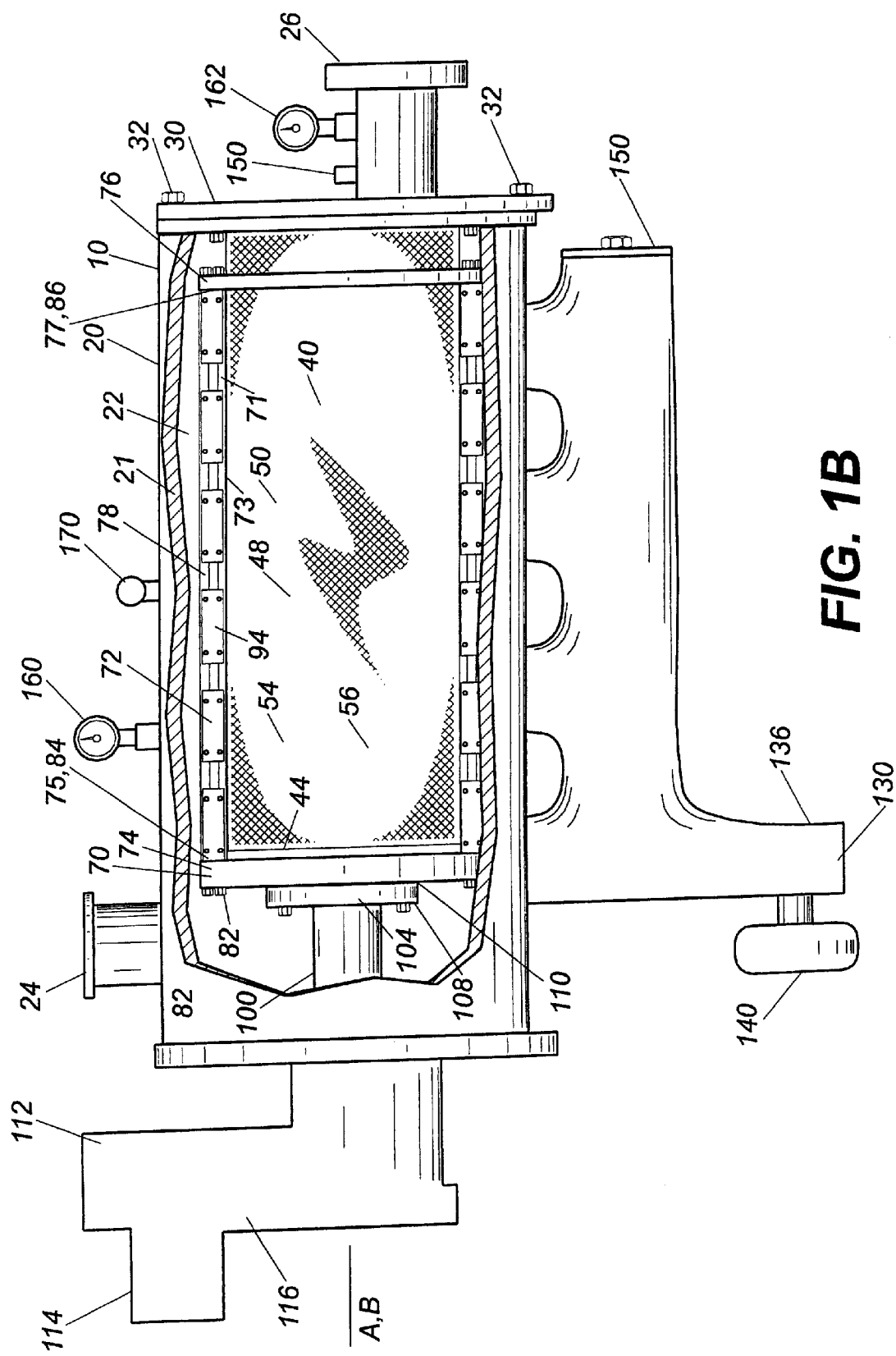
FIG. 1B is a partial cut-away side view of a filter unit according to the present invention.
Figure 2:
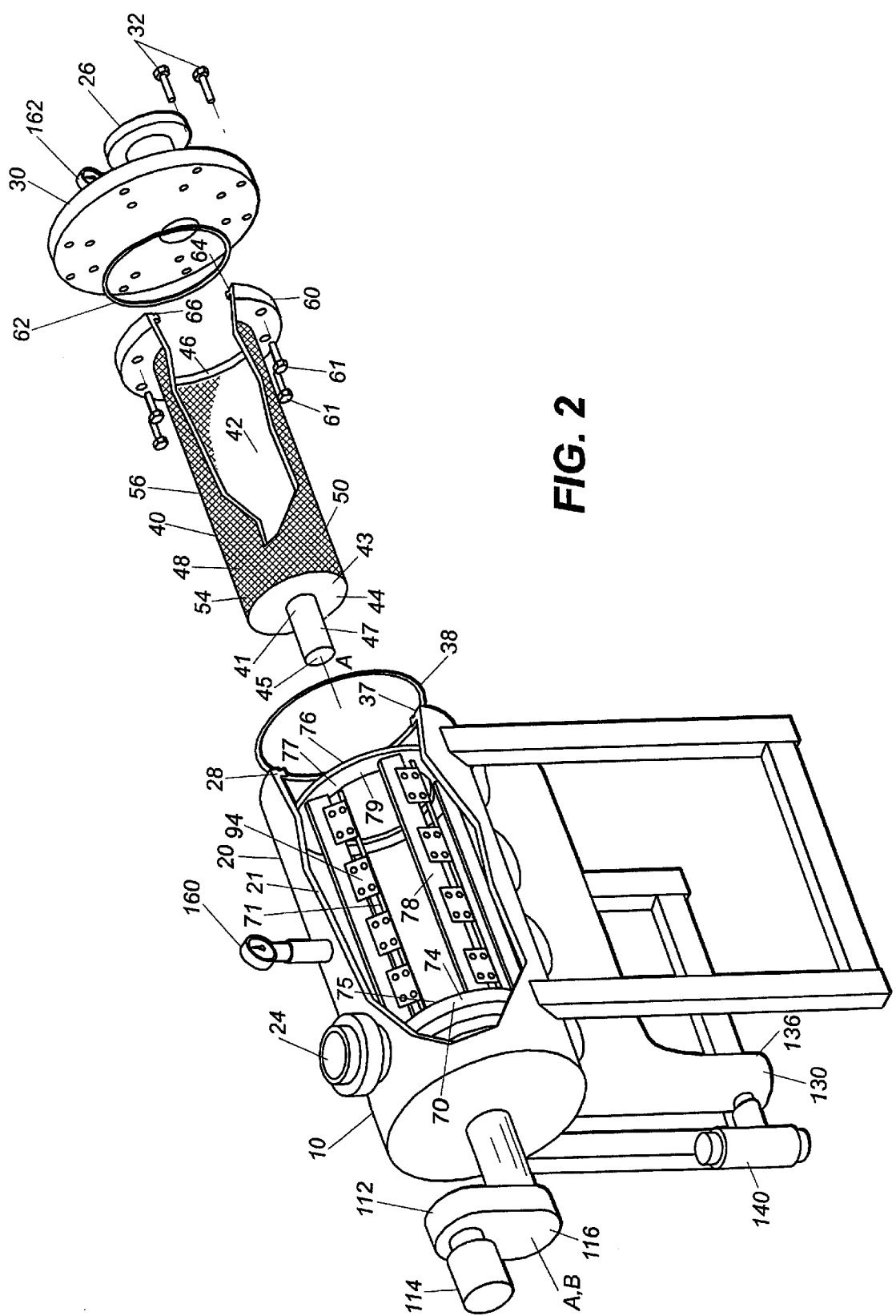
FIG. 2 is an exploded partial cut-away perspective view of a filter element, an outlet port plate, and a first embodiment of a wiper unit of the filter unit of the present invention.

FIGS. 1A, 1B and 2 depicts a first preferred embodiment of the present invention, which is directed to a filter unit, generally 10, comprising a housing 20, a filter element 40 positioned within the housing 20, a wiper unit 70 surrounding at least a portion of the filter element 40, and means for rotating the wiper unit 70 about the center longitudinal axis A of the filter element 40 for removal of solid contaminants accumulated onto the filter element 40 during the filtering process.

The housing 20 has an internal cavity 22, an unfiltered liquid inlet port 24, and a filtered liquid inlet port 26. The housing 20 is preferably cylindrical. The unfiltered liquid inlet port 24 opens through the side wall of the casing 21 of the housing 20 into the internal cavity 22 of the housing 20. The filtered liquid outlet port 26 opens through an access plate 30 which is mounted onto the casing 21 of the housing 20. In the embodiment shown, the access plate 30 is conveniently and conventionally fixed to the casing 21 of the housing 20 by circumferentially spaced nutted bolts 32 extending down through a radially extending annular flange 28 fixed at the side of the casing 21 of the housing 20 with a suitable annular seal 38, such as an O-ring, interposed between the inner surface of the access plate 30 and the flange 28 to seal the connection, thereby preventing outward leakage of pressurized unfiltered liquid therepast. The access plate 30 preferably has an annular recess 37 on the inner surface of the access plate 30 so that the annular seal may be disposed within the annular recess 37 to form an adequate seal.

The filter element 40 is preferably cylindrical and defines a center longitudinal axis A. The filter element 40 has an interior 42 in fluid communication with the filtered fluid outlet port 26, a front closed end 44, an opposed open back end 46 in fluid communication with the filtered liquid outlet port 26, and structure means for detachable securing the filter element 40 within the housing 20 so that the filter element 40 is fixedly mounted relative to the housing 20. The filter element 40 also has a porous sleeve 48, extending between the front closed end 44 and open back end 46 of the filter element 40, and having an exterior face 50, the sleeve 48 in fluid communication with the interior 42 of the filter element 40 and the unfiltered fluid inlet port 24. The unfiltered fluid inlet port 24 for receipt of pressurized unfiltered fluid containing solid contaminants is disposed such that, during the filtering process of the filter unit 10, fluid containing solid contaminants flows into the cavity 22 of the housing 20. Fluid then passes through the sleeve 48 of the filter element 40 from the exterior to the interior 42 of the filter element 40 and solid contaminants are retained on the exterior face 50 of the sleeve 48 and removed from the liquid. The filtered liquid outlet port 26 is disposed such that fluid that is within the interior of the filter element 40 (i.e., fluid having passed through the sleeve 48 of the filter element 40) flows out of the housing 20.

The structure means for detachably connecting the filter element 40 to the housing 20 preferably comprises an radially outwardly extending annular collar 60 which is connected to the filter sleeve 48 at the open back end 46 of the filter element 40. The collar 60 is preferably welded to the filter element 40 to ensure a rigid, non-leaking connection between the annular collar 60 and sleeve 48. In the preferred embodiment shown, the collar 60 of the filter element 40 is preferably conveniently affixed to the access plate 30 of the housing 20 by circumferentially spaced nutted studs 61 extending through the collar 60 and into the inner surface 36 of the access plate 30 of the housing 20 with a suitable annular seal 62, such as an O-ring, interposed between the inner surface 36 of the access plate 30 and the collar mounting surface 64 of the collar 60 to seal the connection between the filter element 40 and the housing 20 to prevent leakage of the pressurized unfiltered liquid therepast. The collar 60 of the filter element 40 preferably has a collar annular groove 66 on the collar mounting surface 64 of the collar 60 so that the annular seal 62 may be disposed within the groove 66 to form an adequate seal.

Mounting the filter element 40 thusly fixedly connects the open back end 46 of the filter element 40 to the housing 20 so that the filter element 40 is not prone to movement during the filtering process and so that the open back end 46 of the filter element 40 is in fluid communication with the filtered liquid outlet port 26. Since the filter element 40 and the housing 20 are static relative to each other, the likelihood of a seal failure is remote.

Removal and replacement of the filter element 40 is straightforward. To remove the filter element 40 from the housing 20, the bolts 32 securing the access plate 30 to the housing 20 are first drawn out and the access plate 30, with the filter element 40 removably attached to the inner surface 36 of the access plate 30, is then pulled away from the housing 20. When the attached filter element 40 is drawn clear of the interior cavity 22 of the housing 20, any desired maintenance to the filter element 40 may be accomplished. After the filter element 40 is withdrawn from the housing 20 of the filter unit 10, if it is desired to replace the filter element 40, for example if it is desired to put in a filter element 40 having a requisite porosity for a forthcoming filtering application, the studs 61 securing the filter element 40 to the access plate 30 are removed to free the filter element 40. Then a filter element 40 of appropriate porosity is secured, using the studs 61 previously removed, to the inner surface 36 of the access plate 30. When either maintenance or replacement of the filter element 40 is completed, the filter element 40 with the attached access plate 30 is placed into the cavity 22 of the housing 20 and the access plate 30 is secured to the housing 20 as described above to fixedly mount the filter element 40 relative to the housing 20.

The sleeve 48 of the filter element 40 is porous and may comprise a metal screen 54 having pores or apertures 52 of a given diameter. The selection of a particular diameter pore 52 is dependent upon the intended use of the filter unit 10, particularly the specific contaminant(s) to be filtered. As a further example, the sleeve 48 may comprise a porous ceramic member. Preferably however, the sleeve 48 of the filter element 40 is a metal screen 54 having pores 52 of a diameter of from about 1500 microns down to 20 microns or less. More particularly, it is preferred that the sleeve 48 is a wedge wire type which is commercially available and is well known in the art. The sleeve 48 forms a cylindrical filter wall 56 formed of a spiral of closely spaced turns of wire, having a general triangular traverse cross-section, that is wrapped spirally around a form [not shown] or an array of support rods [not shown] to form a helix having a cylindrical shape. The wire may be spaced from about 1500 microns to about 20 microns from an adjoining wrap of wire as the wire is wrapped to provide the desired sleeve porosity. The wire is held is spaced relationship by the support rods which are suitably affixed to the wire. Such a sleeve 48 is available from Johnson Screens, 1950 Old Highway 8, New Brighton, Minnesota 55112. In this embodiment, it is preferred that wire be welded to the support rods to form the desired configuration. Further, it is preferred that the support rods and wire at the respective ends of the sleeve 48 be welded to the front closed end 44 and the annular collar 60 of the filter element 40.

Still referring to FIGS. 1A–2, a first embodiment of the wiper unit 70 of the present invention is shown. In this embodiment, the wiper unit 70 overlies at least a portion of the exterior face 50 of the sleeve 48 of the filter unit 10, so that filtered out solids that remain on or are caked onto the overlain portions of the exterior face 50 of the screen may be removed. The wiper unit 70 defines a wiper longitudinal axis B that is coincident to and coaxial with the center longitudinal axis A of the filter element 40. To scrape off accumulated solids, the wiper unit 70 has at least one wiper blade 72 in scraping engagement with at least a portion of the exterior face 50 of the sleeve 48 of the filter element 40. In the preferred embodiment, the wiper unit 70 also comprises a first support member 74, a second support member 76, at least two beams 78 extending therebetween the first support member 74 and the second support member 76, and a means for connecting the wiper blade 72 to the beam 78 so that the wiper blade 72 is oriented inward toward, and in engagement with, the exterior face 50 of the sleeve 48 of the filter element 40.

Preferably, as shown in FIGS. 1A and 2, the first support member 74 has a first mounting surface 75 and the second support member 76 has a second mounting surface 77 opposed to the first mounting surface 75. The second support member 76 also has a circular opening 79 extending therethrough that is of a diameter greater that the exterior diameter of the cylindrical filter element 40 so that the second support member 76 may be disposed around the sleeve 48 of the filter element 40 without engaging the exterior face 50 of the sleeve 48. The beams 78 of the wiper unit 70 extend therebetween, and are connected to, the first mounting surface 75 of the first support member 74 and the second mounting surface 77 of the second support member 76 to form a substantially rigid frame. Each beam 78 is preferably substantially parallel to and overlies a portion of the exterior face 50 of the sleeve 48 of the filter element 40. Further, as shown in FIGS. 1A, 1B, and 3, each beam 78 has a bottom edge that is oriented inward toward the exterior face 50 of the sleeve 48 of the filter element 40.

The beams 78 may be connected to the first and the second support members 74, 76 by any means known in the art, such as by welding, but it is preferred that the beams 78 be connected to the first and second support members 74, 76 by bolts or studs 82 to simplify maintenance. Thus, it is preferred that spaced bolts or studs 82 extend down through the first support member 74 and into a front end 84 of the beam 78 to fixedly connect the front end 84 of the beam 78 to the first mounting surface 75 of the first support member 74. Additional spaced bolts or studs 82 extend down through the second support member 76 into an opposed back end 86 of the beam 78 to secure the back end 86 of the beam 78 to the second mounting surface 77 of the second support member 76.

Figure 4:
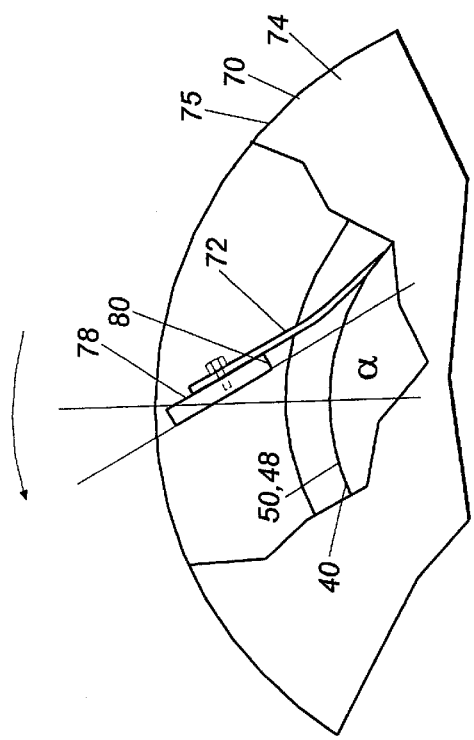
FIG. 4 is an enlarged partial cross-sectional view taken on line 4—4 of FIG. 1A showing a first embodiment of a wiper blade connected to the beam of the wiping unit and in scraping engagement with the exterior face of the filter element.
Figure 5:
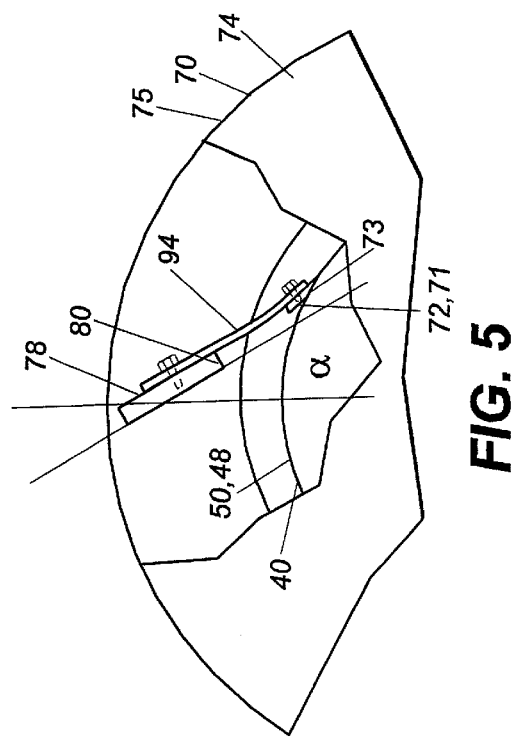
FIG. 5 is an enlarged partial cross-sectional view taken on line 4—4 of FIG. 1A showing a second embodiment of a wiper blade connected to the beam of the wiping unit and in scraping engagement with the exterior face of the filter element.
Figure 3:
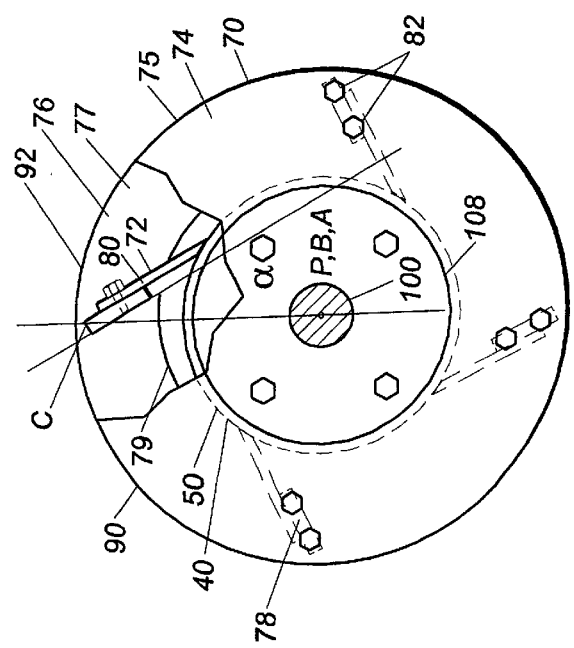
FIG. 3 is a partial cut-away cross-sectional view of the present invention taken on line 3—3 of FIG. 1A showing the beams of the wiper unit mounted to the first support member of the wiper unit at an acute angle so that the bottom edge of the beam is oriented inward toward the exterior face of the filter element.

Referring now to FIGS. 3–5, the first support member 74 defines a center point P coincident with the wiper axis B of the wiper unit 70. Further, when the front end 84 of a beam 78 is connected to the first mounting surface 75 of the first support member 74, a mounting chord C is defined on the first mounting surface 75. This mounting chord is at an acute angle α relative to a line extending from the center point P of the first mounting surface 75 and intersecting the mounting chord C. The acute angle α may be from 0 to 75 degrees, but is preferred to be from 20 to 70 degrees. It is still more preferred that the acute angle α be from 35 to 70 degrees. It is preferred that the back end 86 of the beam 78 is connected to the second mounting surface 77 at the same acute angle α so that the beam 78 may be oriented inward toward, and angled relative to, the exterior face 50 of the sleeve 48 of the filter element 40 at a constant angle.

Furthermore, the first support member 74 has a first outer edge 90 and the second support member 76 has a second outer edge 92. Both the first outer edge 90 of the first support member 74 and the second outer edge 92 of the second support member 76 have a radius that is longer than the radius of the sleeve 48 of the filter element 40. This allows the front end 84 of the beam 78 to be connected to the first mounting surface 75 near the first outer edge 90 and the back end 86 of the beam 78 to be connected to the second mounting surface 77 near the second outer edge 92 so that the bottom edge 80 of the beam 78 overlies and is substantially parallel to the exterior face 50 of the sleeve 48.

As shown in FIG. 4, the wiper blade 72 extends inward and toward the exterior face 50 of the sleeve 48 from the bottom edge 80 of the beam 78. In this embodiment, the wiper blade 72 itself may be made of a piece of resilient material, for example spring steel, for providing the necessary resilient means for urging the wiper blade 72 against the exterior face 50 of the sleeve 48 of the filter element 40. The resilient nature of the material used forces the operative edge of the wiper blade 72, which preferably extends the substantial length of the wiper blade 72, tightly against the exterior face 50 of the sleeve 48 in order to remove accumulated solids or cake from the exterior face 50 of the sleeve 48 of the filter element 40 when the wiper unit 70 is rotated counter-clockwise about the wiper axis B and the coincident center longitudinal axis A.

Alternatively, as shown in FIGS. 1A, 1B and 5, the wiper blade 72 may be an elongated rod 71 having an operative edge 73 extending the substantial length of the wiper blade 72. The means for resiliently urging the wiper blade 72 into operative contact with the exterior face 50 of the sleeve 48 of the filter element 40 comprises at least one resilient member 94, made for example from spring steel, interposed between, and connected to, the beam 78 and the wiper blade 72. The resilient member extends inward, and toward, the exterior face 50 of the sleeve 48 from the bottom edge 80 of the beam 78. Because the space between the bottom edge of the beam 78 and the exterior face 50 of the sleeve 48 is less than the operative length of the resilient member 90 extending beyond the bottom edge 80 of the beam 78 to the operative edge 73 of the wiper blade 72 when the resilient member 90 is unloaded, the resilient member 90 is forced to bend when the wiper unit 70 operatively engages the filter element 40, which in turn forces the operative edge 73 of the wiper blade 72 into scraping engagement with the exterior face 50 of the sleeve 48. The operative edge 73 of the wiper blade 72 may form a square edge or a chiseled point in traverse cross-section. However, it is preferred that the operative edge 73 form a chisel point so that the operative edge of the wiper blade 72 has more surface area in scraping engagement with the exterior face 50 of the sleeve 48.

When the wiper unit 70 is rotated counter-clockwise about the wiper axis B and the coincident center longitudinal axis A of the filter element 40, the wiper blade 72 is resiliently pressed against the exterior face 50 of the filter element 40 and the accumulated solid contaminants or cake are scraped off the exterior face 50 by the wiper blade 72. The scraped off solid contaminants then tend to fall toward the groundside surface 23 of the housing 20 for removal.

FIG. 6 shows a second embodiment of a wiper unit 70 of the present invention. The construction of the second embodiment is similar to the first embodiment and, accordingly, uses the same reference numbers for similar components. The components in FIG. 6 that use the same reference numbers as in FIGS. 1A, 1B and 2 are substantially equivalent and, therefore, the description thereof is omitted for the second embodiment of the wiper unit 70.

In the second embodiment of the wiper unit 70, shown in FIG. 6, the wiper unit 70 comprises a first support member 74, at least one beam 78 connected to and extending substantially perpendicular to the first mounting surface 75 of the first support member 74 so that the beam 78 is substantially parallel to and overlying a portion of the exterior face 50 of the sleeve 48 of the filter element 40, and a wiper blade 72 connected to the beam 78. As one skilled in the art would appreciate, the second embodiment of the wiper unit 70 is the same as the first embodiment with the exception that the second support member 76 is not required.

Referring now to FIGS. 1A, 1B, 2 and 6, the rotation means of the present invention preferably comprises a rotatable shaft member 100 located substantially along the wiper axis B of the wiper unit 70 (which is coincident and co-axial with the center longitudinal axis A of the filter element 40). The rotatable shaft member 100 has a distal shaft end 102 and an opposed proximal shaft end 104. The proximal shaft end 104 extends through a packing 106 into the cavity 22 of the housing 20 where it is operatively connected to the first support member 74 of the wiper unit 70. The packing 106 is preferably a mechanical seal 107 for prevention of leaking or weeping of pressurized fluids from the cavity 22 of the housing 20. Such a mechanical seal 107 is commercially available and is well know in the art. For example, such a mechanical seal 107 is available from John Crane, 5933 Peachtree Industrial, Norcross, Ga. 30092.

The rotatable shaft member 100 may be connected to the wiper unit by any means known to one skilled in the art. However, to facilitate the connection of the rotatable shaft member 100 to the wiper unit 70 to effect rotation of the wiper unit 70, it is preferred that the proximal shaft end 104 be welded to a shaft plate 108 which is substantially perpendicular to the rotatable shaft member 100. Spaced bolts or screws extend through the shaft plate 108 into a plate mounting surface 110 of the first support member 74 of the wiper unit 70 so that the rotatable shaft member 100 may be fixedly attached to the wiper unit 70.

Referring to FIGS. 1A and 2, the rotation means also preferably comprises a motor and speed reducer unit 112. The motor 114 is mounted onto the exterior of the casing 21 of the housing 20 and has a gear reduction unit or other suitable drive indicated at 116, and is operatively connected to the distal shaft end 102 of the rotatable shaft member 100.

To reduce and/or prevent undesirable movement of the wiper unit 70 about the coincident wiper axis B of the wiper unit 70 and the center longitudinal axis A of the filter element 40, it is preferred that the filter element 40 have a circular bearing shaft 41 extending from the exterior end face 43 of the front closed end 44 (which is spaced from and opposes the first mounting surface 75 of the first support member 74) of the filter element 40. This bearing shaft 41 has a distal end 45, a bearing shaft surface 47, and is coaxial with the center longitudinal axis A of the filter element 40. The first support member 74 also has a notch 120 or a bore 121 extending inward therein from the first mounting surface 75, coincident and co-axial to the wiper axis B of the wiper unit 70 and the center longitudinal axis A of the filter element 40, to receive the bearing shaft 41 of the filter element 40. To prevent galling, it is preferred that a bearing bushing 122, having an inner diameter complementarily sized to receive the bearing shaft 41 of the filter element 40, be pressed into the notch 120 or bore 121 of the first support member 74. Thus, preferably, the distal end 45 of the bearing shaft 41 extends into and rests within the bearing bushing 122 seated within the notch 120 or bore 121 of the first support member 74 so that the wiper axis B of the wiper unit 70 is co-axial with the center longitudinal axis A of the filter element 40 and so that the wiper unit 70 may rotate about the filter element 40.

Operationally, as one skilled in the art will appreciate, when the wiper unit 70 is rotated about the wiper axis B, the first support member 74 of the wiper unit 70 rotates about the bearing shaft surface 47 of the bearing shaft 41 of the filter element 40, which aids in maintaining the desired parallel spacing of the beams 78 of the wiper unit 70 relative to the exterior face 50 of the sleeve 48 of the filter element 40. Further, referring to FIG. 1A, preferably the rotatable shaft member 100, the wiper unit 70, the notch 120 or bore 121 within the wiper unit 70, the filter element 40, and the bearing shaft 41 of the filter element 40 are all coincident with the center longitudinal axis A of the filter element 40. When the filter element 40 is fixedly mounted relative to the housing 20, the bearing shaft 41 of the filter element 40 is also "fixed" relative to the housing 20. Therefore, when the rotatable shaft member 100 is supported by the fixed mechanical seal in the casing 21 of the housing 20, movement of the wiper unit 70 relative to the filter element 40, other than the desired rotation movement of the wiper unit 70 about the wiper axis B and the co-axial longitudinal axis A of the filter element 40, is minimized when the notch 120 or bore 121 within the first support member 74 is operatively connected to the stationary or "fixed" bearing shaft 41 of the stationary or "fixed" filter element 40.

With reference to FIGS. 1A and 2, the removal of the wiper unit 70 of the present invention for maintenance is uncomplicated. To remove the wiper unit 70 from the housing 20 of the filter unit 10, the access plate 30 and the attached filter element 40 are first removed from the housing 20 of the filter unit 10, as described above, which exposes the wiper unit 70 within the cavity 22. Then the rotatable shaft member 100 is disconnected from the motor 112 and the wiper unit 70, with the rotatable shaft member 100 attached, is withdrawn from the housing 20 of the filter unit 10 for any necessary repair. As one skilled in the art will appreciate, when maintenance to the wiper unit 70 is completed, replacement of the wiper unit 70 back into the filter unit 10 is easily accomplished. First, the wiper unit 70 with the attached rotatable shaft member 100 is placed into the cavity 22 of the housing 20; second, the distal shaft end 102 of the rotatable shaft member 100 is pushed through the mechanical seal of the housing 20; and, finally, the distal shaft end 102 of the rotatable shaft member 100 is operatively connected to the motor 112 to secure the wiper unit 70 within the filter unit 10.

In operation, as shown in FIGS. 1A, 1B, 2 and 6, when a supply of pressurized contaminated liquid to be filtered is connected to the unfiltered liquid inlet port 24, the liquid flows through the filter sleeve 48 of the filter element 40 and then filtered liquid discharges from the filtered liquid outlet port 26. Debris from the contaminated liquid are left on the exterior face 50 of the sleeve 48. As the wiper unit 70 rotates, the wiper blade 72 is forced into scraping engagement with a portion of the exterior face 50 of the sleeve 48 and breaks loose any debris in the path of the scraping wiper blade 72 that may have lodged into or onto the exterior face 50 of the sleeve 48 of the filter unit 10. These solid contaminant debris tend to fall, under the influence of gravity, toward the groundside portion of the of the cavity 22 of the housing 20. For removal of the accumulated solid contaminants, it is thus preferred that the housing 20 further have a contaminant outlet port 130 in fluid communication with the cavity 22 of the housing 20 and a means for opening and closing the contaminant outlet port 130. The contaminant outlet port 130 opens through at least one contaminant opening 132 in the side wall of the casing 21 of the housing 20 into the internal cavity 22 of the housing 20. It is further preferred that the contaminant outlet port 130 extend from the groundside surface 23 of the casing 21 of the housing 20 to maximize the removal of contaminants falling toward the groundside portion of the housing cavity 22. The contaminant outlet port 130 may also extend away from the casing 21 of the housing 20 and define a manifold space 134 between the groundside surface 23 of the housing 20 and the opening and closing means of the contaminant outlet port 130. The manifold space 134 of the contaminant outlet port 130 provides additional volume for contaminant solids scraped from the exterior face 50 of the sleeve 48 of the filter element 40 during the filtering process to accumulate before being purged out through the opening and closing means of the contaminant outlet port 130.

The opening and closing means of the contaminant outlet port 130 is preferably a purge valve 140. The purge valve 140 is typically positioned near the distal end 136 of the contaminant outlet port 130. The purge valve 140 preferably defines a passage [not shown] through which the accumulated contaminant solids and accompanying unfiltered fluid from the cavity 22 of the housing 20 traverses and a valve actuator control means for adjusting the passage to change the rate of flow of the contaminant solids and accompanying unfiltered fluid therethrough. The purge valve 140 can be a binary valve, which is in either a fully opened or fully closed position, or, more preferably, a proportional valve, in which the passage of the purge valve 140 is opened proportionally corresponding to various desired flow rates. The purge valve 140 is preferably a high speed, flow regulating solenoid valve for regulating the flow of unfiltered liquid and accumulated solid contaminants exiting the cavity 22 of the housing 20 through the contaminant outlet port 130.

The housing 20 of the filter unit 10 of the present invention may also preferably have a flush inlet 150 in fluid communication with the cavity 22 of the housing 20 so that a cleansing fluid may be introduced into the cavity 22 for cleansing of the cavity 22 of the housing 20, the wiper unit 70, and the filter element 40. The flush inlet 150 may open through the side wall of the casing 21 of the housing 20 into the cavity 22 of the housing 20 at any suitable location on the housing 20. However, it is preferred that the flush inlet 150 be near the contaminant outlet port 130 of the filter unit 10.

During cleansing, the unfiltered fluid inlet port 24 and the filtered fluid outlet port 26 are preferably sealed. The contaminant outlet port 130 is then opened to atmospheric discharge and cleansing fluid enters the filter housing 20 through the flush inlet 150. The rotation means may concurrently rotate the wiper unit 70 about the wiper axis B and about the filter element 40 to scrape off any contaminants present on the scraped portions of the exterior face 50 of the sleeve 48 of the filter element 40. The cleansing fluid containing the contaminants then passes out of the housing 20 via the contaminant outlet port 130. In the preferred embodiment, it is preferred that the cleansing fluid is pressurized before entering the housing 20, e.g., by increasing the flow rate of the cleansing fluid.

Alternatively, it is preferred that the flush inlet 150 open through the side wall of the filtered liquid outlet port 26. Here, the cleansing fluid, preferably pressurized, introduced into the interior of the filter element 40 via the flush inlet 150 during the cleansing operation described above, acts to back-flush the apertures of the sleeve 48 of the filter element 40. The cleansing fluid passes through the apertures 52 of the sleeve 48 in a direction opposite the normal filter flow, to help dislodge and remove contaminants that may have become clogged in the apertures 52 of the sleeve 48 and that can not be scrapped off the filter element 40 by the wiper unit 70.

The filter unit 10 of the present invention may also have a contamination detection means for detecting when the degree of contamination of the filter element 40 reaches a level at which the flow of fluid through the filter unit 10 drops below an effective level. The degree of contamination indicates the degree that the apertures 52 in the porous sleeve 48 of the filter element 40 that are in fluid communication with the unfiltered liquid within the cavity 22 of the housing 20 and the filtered liquid within the interior 42 of the filter element 40 are clogged with contaminant solids. Detecting the degree of contamination of the filter element 40 may provide two benefits. First, the contamination detection means may provide an indication of the ongoing efficiency of the filter unit 10 (by indicating the efficiency of the throughput of the fluid through the sleeve 48 of the filter unit 10). Second, the contamination detection means may also provided an indication of a possible safety hazard in pressure filter units 10, such as the present invention, where the unfiltered fluid is delivered to the unfiltered fluid inlet port 24 of the filter unit 10 and thence into the cavity 22 of the housing 20 under pressure (by indicating a pressure buildup within the cavity 22 of the housing 20 due to the contamination of the sleeve 48 of the filter element 40).

Referring to FIGS. 1A, 1B, 2 and 6, a first embodiment of the contamination detection means comprises a first pressure sensor 160 and a second pressure sensor 162. The first and the second pressure sensors 160, 162 may, for example, be comprised of commercially available pressure sensors from WIKA, 1000 Wiegard Blvd., Larenceville, Ga., 30043. However, it must be noted that any pressure sensor capable of sensing the pressure of the fluid proximate the pressure sensor may be used. Preferably, the first pressure sensor 160 is mounted to the casing 21 of the housing 20 and extends into the cavity 22 of the housing 20 in communication with the unfiltered fluid for sensing the pressure of the unfiltered liquid within the cavity 22 of the housing 20. Similarly, the second pressure sensor 162 is disposed in the flow path of the filtered fluid within the filtered fluid outlet port 26 for sensing the pressure of the filtered liquid exiting the interior 42 of the filter element 40. An increase in the pressure differential sensed between the first pressure sensor 160 and the second pressure sensor 162 indicates that the degree of contamination of the filter sleeve 48 is increasing. Alternatively, a pressure differential switch or transducer may be used. This is preferred, since it requires only one sensor—the pressure differential switch or transducer—to act as both the first pressure sensor 160 and the second pressure sensor 162.

Figure 7:
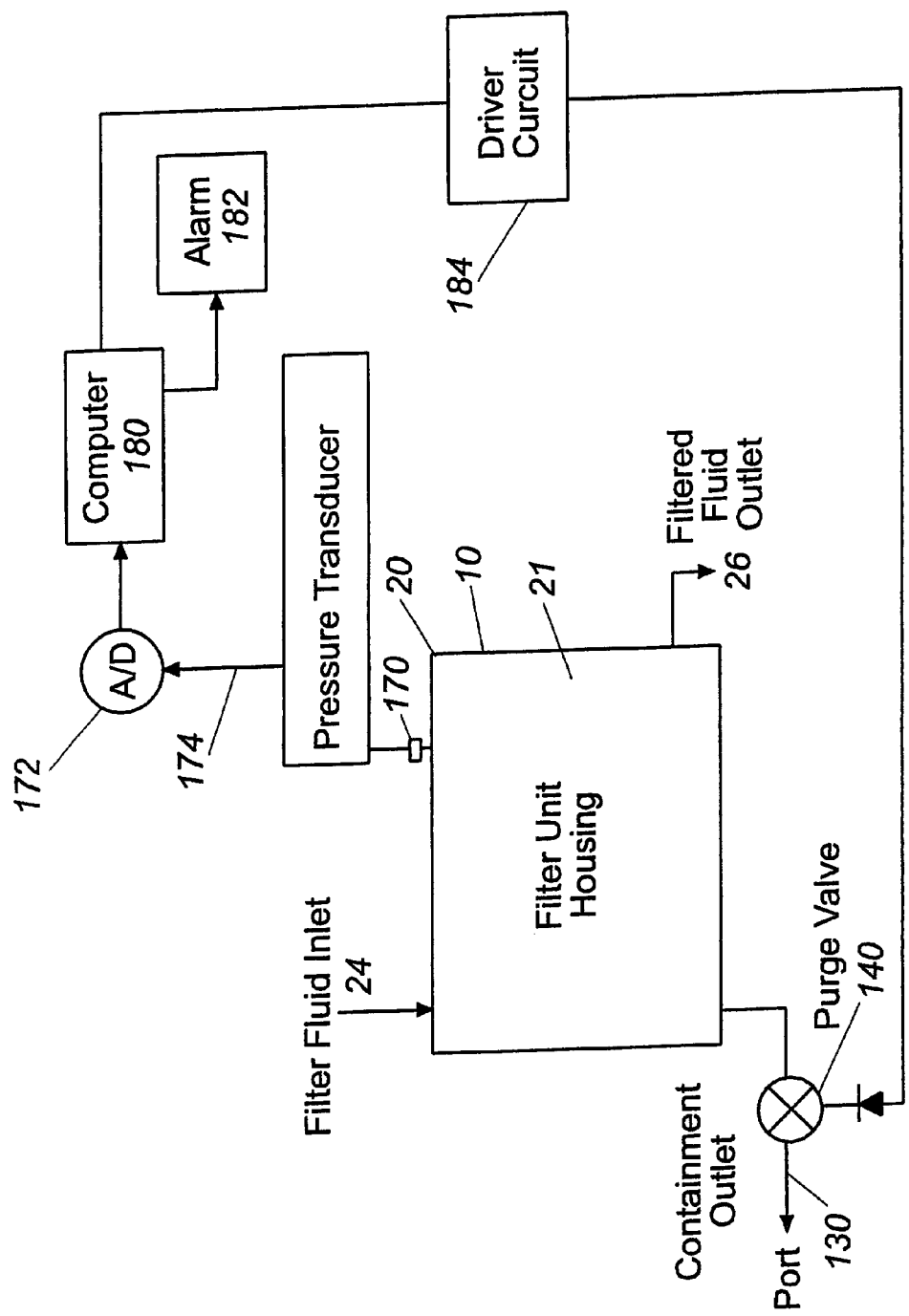
FIG. 7 is a block diagram illustrating an embodiment of the contamination detection means of the filter unit of the present invention.

Referring now to FIGS. 1A, 1B and 7, a second embodiment of the contamination detection means comprises a pressure sensor 170 and a monitoring means. The pressure sensor 170 generates a pressure signal representative of the pressure of the fluid proximate the pressure sensor 170. More particularly, the pressure sensor 170 is preferably a piezoresistive pressure sensor or a solid state pressure transducer. The pressure sensor 170 is preferably mounted onto the casing 21 of the housing 20 in communication with the unfiltered fluid within the cavity 22 of the housing 20. The pressure signal from the pressure sensor 170 may be transmitted through analog-to-digital converter 172, if required, to the monitoring means on pressure signal line 174.

Preferably, the monitoring means is a microcontroller 180 that is electrically coupled to the pressure sensor 170 via pressure signal line 174. The microcontroller 180 may be analog or digital and should contain circuits to be programmed for performing mathematical functions such as waveform averaging, amplification, linearization, signal rejection, differentiation, integration, addition, subtraction, division and multiplication, where desired. Circuits or programs for performing these functions are conventional and well known. The data derived from the signal produced by the pressure sensor 170 are stored in the memory of the microcontroller 180 at user-defined rates for as needed retrieval and analysis. The pressure sensor 170 may continually sense the pressure of the unfiltered liquid proximate the pressure sensor 170.

The circuitry for monitoring the pressure of the unfiltered fluid within the cavity 22 of the housing 20 of the filter unit 10 can be embodied by other circuitry well known in the art. For example, while the monitoring means has been described as comprising a microcontroller 180, the functions of the microcontroller 180 could be achieved by other circuits such as an application specific integrated circuit (ASIC), digital logic circuits, analog logic circuits, a microprocessor, or a digital signal processor.

The monitoring means is responsive to the output (i.e., the pressure signal) of the pressure sensing means to continually monitor the pressure of the unfiltered fluid within the cavity 22 of the housing 20 of the filter unit 10. The monitoring means compares the sensed pressure of the unfiltered liquid to a predetermined baseline pressure, which is a pressure selected by the operator of the filter unit 10 that is in excess of the pressure of the unfiltered liquid delivered to unfiltered liquid inlet port 24, and generates a response signal based on the comparison. The monitoring means generates the response signal when the pressure of the unfiltered liquid in the cavity 22 of the housing 20 exceeds the predetermined baseline pressure by a predetermined exceedance range. This exceedance range is preferably 2 to 50 lbs. More particularly, it is preferred that the exceedance range be 2 to 10 lbs. Then, in response to the response signal of the monitoring means, an alarm 182 may generate a warning that is suitable for alerting the operator that the pressure within the cavity 22 of the housing 20 has increased beyond the predetermined baseline pressure which indicates contamination or clogging of the apertures 52 of the sleeve 48 of the filter element 40.

Preferably, the opening and closing means of the contaminant outlet port 130 is operatively connected to the monitoring means. Still more particularly, it is preferred that the purge valve 140 is electrically coupled to the monitoring means via driver circuit line 184. Thus, in response to the response signal, the actuator control means of the purge valve 140 may be regulated open to purge accumulated solids, and accompanying unfiltered liquid, from within the cavity 22 of the housing 20 and the contaminant outlet port 130. As one skilled in the art will appreciate, the opening of the purge valve 140 will lower the pressure of the unfiltered fluid remaining in the cavity 22 of the housing 20.

It is preferred that the monitoring means have a user-defined time delay which delays the generation of the response signal when the pressure of the unfiltered liquid in the cavity 22 of the housing 20 exceeds the predetermined baseline pressure. This allows for minor, transient fluctuations of pressure during the filtering process without undue, and perhaps unnecessary, cycling of the purge valve 140. This time delay is preferably in the range of five (5) to thirty (30) seconds. And more particularly, is in the range of ten (10) to fifteen (15) seconds.

The monitoring means also detects when the pressure of the unfiltered liquid is at or below the predetermined baseline pressure and generates a termination signal in response thereto. Then, in response to the termination signal of the monitoring means, the alarm 182 may be extinguished and the actuator control means of the purge valve 140 is regulated closed.

Although the present invention has been described with reference to specific details of certain embodiments thereof, it is not intended that such details should be regarded as limitations upon the scope of the invention except as and to the extent that they are included in the accompanying claims.

What is claimed is:

1. A filter unit for filtering liquid carrying solid contaminants, comprising:

a housing having a casing, an access plate, an interior cavity, an unfiltered liquid inlet port, and a filtered liquid outlet port, the access plate detachably secured to the casing to define the interior cavity of the housing, wherein the unfiltered liquid inlet port is in communication with the interior cavity, and wherein the filtered liquid outlet port extends therethrough the access plate;

a filter element having a generally cylindrical shape positioned within the cavity of the housing and detachably secured to the access plate of the housing, the filter element defining a center longitudinal axis, an interior, and a porous filter sleeve having an exterior face, the interior of the filter element in fluid communication with the filtered liquid outlet port and the exterior face of the sleeve of the filter element in fluid communication with the unfiltered liquid inlet port; wherein pressurized liquid carrying solid contaminants flows into the cavity of the housing through the unfiltered liquid inlet port, the solid contaminants are filtered from the liquid and deposited thereon the exterior face of the filter sleeve as the liquid passes through the sleeve of the filter element to the interior thereof before exiting the filter element via the filtered liquid outlet port;

a wiper unit overlying at least a portion of the exterior face of the filter sleeve of the filter element for removal of accumulated solid contaminants from the exterior face of the filter sleeve;

engaging means for detachably positioning the filter element in operative contact with the wiper unit so that the filter element is in a select one of an engaged position, in which, the access plate, having the detachably secured filter element secured thereto, is secured to the casing of the housing and a portion of the wiper unit is in a first position in operative contact with the filter element, and a released position, in which, the access plate, having the detachably secured filter element secured thereto, is detached from the casing of the housing, the filter element is withdrawn from the cavity of the housing and the wiper unit remains within the interior cavity of the housing in the first position, wherein the wiper unit axis is co-axial to the center longitudinal axis of the filter element when the filter element is positioned within the cavity of the housing; and rotation means for rotating the wiper unit about the center longitudinal axis of the filter element for removal of accumulated solid contaminants from at least a portion of the exterior face of the filter element.

2. The filter unit of claim 1, wherein the wiper unit has at least one wiper blade in scraping engagement with at least a portion of the exterior face of the sleeve of the filter element for displacing accumulated solid contaminants from at least a portion of the exterior face of the sleeve of the filter element.

3. The filter unit of claim 2, wherein the wiper unit further comprises:

a first support member having a first mounting surface;

at least one beam connected to, and extending substantially perpendicular therefrom, the first mounting surface of the first support member, the beam being substantially parallel to and overlying a portion of the exterior face of the sleeve of the filter element, the beam having a bottom edge oriented inward toward the exterior face of the sleeve of the filter element; and wherein the wiper blade is connected to the beam so that the wiper blade is oriented inward toward, and in cleansing engagement with, at least a portion of the exterior face of the sleeve of the filter element.

4. The filter unit of claim 3, wherein the wiper unit further comprises a second support member having an circular opening sized for disposition of the second support member around the exterior face of the sleeve of the filter element and a second mounting surface opposed to the first mounting surface, wherein the wiper unit has at least two beams, and wherein each beam extends therebetween and is connected to the first mounting surface of the first support member and the second mounting surface of the second support member so that each beam is substantially parallel to and overlying a portion of the exterior face of the sleeve of the filter element.

5. The filter unit of claim 4, wherein the wiper unit further comprises resilient means for urging the wiper blade resiliently against the exterior face of the filter element.

6. The filter unit of claim 5, wherein the resilient means comprises at least one resilient member connected to at least one beam and connected to the wiper blade so that the resilient member is interposed between at least one beam and the wiper blade for resiliently urging the wiper blade against the exterior face of the filter element.

7. The filter unit of claim 4, wherein the beam has a front end and an opposed second end, wherein the first support member has a first center point coincident with the wiper axis of the wiper unit, and wherein the front end of the beams are connected to the first mounting surface of the first support member and defines a mounting chord on the first mounting surface that is at an acute angle relative to a line extending from the center point and intersecting the mounting chord.

8. The filter unit of 7, wherein the back end of the beam is connected to the second mounting surface beam so that the beams are oriented inward toward, and angled relative to, the exterior face of the filter element at a constant angle.

9. The filter unit of claim 7, wherein the acute angle is from 0 to 75 degrees.

10. The filter unit of claim 4, wherein the first support member has a first outer edge, wherein the second support member has a second outer edge, wherein the front end of the beams are connected to the first mounting surface near the first outer edge, and wherein the back end of the beam is connected to the second mounting surface near the second outer edge.

11. The filter unit of claim 3, wherein the access plate has an inner surface, wherein the filter element has a front closed end and an opposed open back end, the front closed end having an exterior end face opposing the first mounting surface of the first support member, the exterior end face having a circular bearing shaft extending therefrom co-axial with the center longitudinal axis of the filter element, the bearing shaft having a distal end, the open back end of the filter element detachably mounted to the inner surface of the access plate of the housing and in fluid communication with the filtered liquid outlet port, wherein the first mounting surface of the first support member has a notch extending therein, the notch co-axial with the wiper axis of the wiper unit, the distal end of the bearing shaft resting within the notch of the first support member when the filter element is positioned in operative contact with the wiper unit.

12. The filter unit of claim 11, wherein the housing has a radially extending annular flange having a plurality of flange orifices extending therein, and wherein the engaging means comprises:

a plurality of radially spaced access plate bores extending therethrough the access plate, the access plate bores complementarily spaced so that each plate bore is co-axial with one flange orifice when the access plate is detachably engaged to the annular flange of the housing; and a plurality of mechanical fasteners, each mechanical fastener having an exterior surface, wherein a respective flange orifice and a portion of the exterior surface of the mechanical fastener have complementary threaded surfaces, and wherein each mechanical fastener extends through the plate bore of the access plate collar and is detachable secured within the flange orifice.

13. The filter unit of claim 12, wherein the inner surface of the access plate has a plurality of radially spaced filter mounting orifices extending therein, the filter mounting orifices intermediate the access plate bores and the filtered liquid outlet port, and wherein the filter element has an annular collar fixedly connected to the open back end of the filter element, the annular collar extending outwardly radially from the exterior face of the filter sleeve, wherein the annular collar has a plurality of mounting bores extending therethrough the annular collar; and further comprising a plurality of mechanical fasteners, each fastener complementarily sized to engage one filter mounting orifice, wherein each mechanical fastener is disposed through one mounting bore of the annular collar and is secured within one filter mounting orifice so that the filter element is detachable secured to the inner surface of the access plate.

14. The filter unit of claim 1, wherein the rotation means comprises a rotatable shaft member located substantially co-axial to the center longitudinal axis of the filter element.

15. The filter unit of claim 14, further comprising a motor fixed with respect to the housing for rotating the rotatable shaft member.

16. The filter unit of claim 1, wherein the housing further comprises:

a contaminant outlet port in fluid communication with the cavity of the housing; and means for opening and closing the contaminant outlet port for removal of accumulated contaminants.

17. The filter unit of claim 16, wherein the housing has a groundside surface and wherein the contaminant outlet port extends from the groundside surface of the housing.

18. The filter unit of claim 17, wherein the contaminant outlet port is disposed so that contaminants fall into a manifold space defined between the groundside surface of the housing and the contaminant outlet port.

19. The filter unit of claim 16, wherein the means for opening and closing the contaminant outlet port comprises a purge valve.

20. The filter unit of claim 16, wherein the housing further comprises a flush inlet in fluid communication with the cavity of the housing so that cleansing fluid way be introduced into the cavity for cleansing of the cavity of the housing, the wiper unit, and the filter element.

21. The filter unit of claim 1, further comprising contamination detection means for detecting the degree of contamination of the filter element.

22. The filter unit of claim 21, wherein the contamination detecting means comprises:

a first pressure sensor attached to the housing and extending into the cavity of the housing for sensing the pressure of the unfiltered liquid within the cavity of the housing; and a second pressure sensor disposed in the flow path of the filtered fluid within the filtered fluid outlet port for sensing the pressure of the filtered liquid exiting the interior of the filter element.

23. A filter unit for filtering liquid carrying solid contaminants, comprising:

a housing having a casing, an access plate, an interior cavity, an unfiltered liquid inlet port, and a filtered liquid outlet port, the casing having a radially extending annular flange, the access plate detachably secured to the annular flange of the casing to define the interior cavity of the housing, wherein the unfiltered liquid inlet port is in communication with the interior cavity, and wherein the filtered liquid outlet port extends therethrough the access plate;

a filter element having a generally cylindrical shape positioned within the cavity of the housing and detachably secured to the access plate of the housing, the filter element defining a center longitudinal axis, an interior, and a porous filter sleeve having an exterior face, the interior of the filter element in fluid communication with the filtered liquid outlet port and the exterior face of the sleeve of the filter element in fluid communication with the unfiltered liquid inlet port; wherein pressurized liquid carrying solid contaminants flows into the cavity of the housing through the unfiltered liquid inlet port, the solid contaminants are filtered from the liquid and deposited thereon the exterior face of the filter element as the liquid passes through the sleeve of the filter element to the interior thereof before exiting the filter element via the filtered liquid outlet port;

a wiper unit surrounding at least a portion of the filter element for removal of accumulated solid contaminants from the exterior face of the filter sleeve, the wiper unit defining a wiper unit axis coaxial with the center longitudinal axis of the filter element; and a rotatable shaft member extending therein the cavity of the housing co-axial to the wiper unit axis; wherein the wiper unit is fixedly attached to the shaft member to facilitate co-axial rotation of the wiper unit with respect to the filter element for removal of accumulated solids from at least a portion of the exterior face of the sleeve of the filter element, wherein the filter element is in a select one of an engaged position, in which, the access plate, having the detachably secured filter element secured thereto, is secured to the annular flange of the housing and a portion of the wiper unit is in a first position in operative contact with the filter element, and a released position, in which, the access plate, having the detachably secured filter element secured thereto, is detached from the annular flange of the housing, the filter element is withdrawn from the cavity of the housing and the wiper unit remains within the interior cavity of the housing in the first position.

24. The filter unit of claim 23, wherein the wiper unit has at least one wiper blade in cleansing engagement with at least a portion of the exterior face of the filter sleeve of the filter element for displacing solid contaminants from at least a portion of the exterior face of the sleeve of the filter element.

25. The filter unit of claim 24, wherein the wiper unit further comprises:

a first support member having a first mounting surface;

a second support member having an circular opening sized for disposition of the second support member around the exterior face of the filter element and a second mounting surface opposed to the first mounting surface;

at least two beams, each beam having a front end and an opposed back end and extending longitudinally therebetween, and connected to, the first mounting surface of the first support member and the second mounting surface of the second support member, the beam being substantially parallel to and overlying the exterior face of the sleeve of the filter element, the beam having a bottom edge oriented inward toward the exterior face of the sleeve of the filter element;

at least one resilient member connected to at least one beam and connected to the wiper blade so that the resilient member is interposed between at least one beam and the wiper blade so that the wiper blade is oriented inward toward, and urged into cleansing engagement with, at least a portion of the exterior face of the sleeve of the filter element.

26. The filter unit of claim 25, wherein the support member has a first center point coincident with the wiper axis of the wiper unit, wherein the front end of the beams are connected to the first mounting surface of the first support member and defines a mounting chord on the first mounting surface that is at an acute angle relative to a line extending from the center point and intersecting the mounting chord.

27. The filter unit of claim 26, wherein the back end of the beams are connected to the second mounting surface beam so that at the beams are oriented inward toward, and angled relative to, the exterior face of the sleeve of the filter element at a constant angle.

28. The filter unit of claim 27, wherein the first support member has a first outer edge, wherein the second support member has a second outer edge, wherein the front end of the beams are connected to the first mounting surface near the first outer edge, and wherein the back end of the beams are connected to the second mounting surface near the second outer edge.

29. The filter unit of claim 26, wherein the acute angle is from 0 to 75 degrees.

30. The filter unit of claim 25, wherein the access plate has an inner surface, and wherein the filter element has a front closed end and an opposed back open end, the front closed end having an exterior end face opposing the first mounting surface of the first support member, the exterior end face having a circular bearing shaft extending therefrom coaxial with the center longitudinal axis of the filter element, the bearing shaft having a distal end, the open end of the filter element detachably mounted to the housing and in fluid communication with the filtered liquid outlet port, wherein the first mounting surface of the first support member has a notch extending therein, the notch co-axial with the wiper axis of the wiper unit, the distal end of the bearing shaft resting within the notch of the first support member when the filter element is positioned in operative contact with the wiper unit.

31. The filter unit of claim 30, wherein the inner surface of the access plate has a plurality of radially spaced filter mounting orifices extending therein, the filter mounting orifices spaced from and radially surrounding the filtered liquid outlet port, and wherein the filter element has an annular collar fixedly connected to the open back end of the filter element, the annular collar extending outwardly radially from the exterior surface of the filter sleeve, wherein the annular collar has a plurality of mounting bores extending therethrough the annular collar, and further comprising a plurality of mechanical fasteners, each fastener complementarily sized to engaged one filter mounting orifice, wherein each mechanical fastener is disposed through one mounting bore of the annular collar and is secured within one filter mounting orifice so that the filter element is detachable secured to the inner surface of the access plate.

32. The filter unit of claim 23, further comprising a motor fixed with respect to the housing for rotating the rotatable shaft member.

33. The filter unit of claim 23, wherein the housing further comprises a contaminant outlet port having an outlet distal end and a purge valve attached to the contaminant outlet port adjacent the outlet distal end, the contaminant outlet port in fluid communication with the cavity of the housing so that accumulated contaminants may be purged.

34. The filter unit of claim 33, wherein the housing has a groundside surface and wherein the contaminant outlet port extends from the groundside surface of the housing.

35. The filter unit of claim 34, wherein the contaminant outlet port is disposed so that contaminants fall into a manifold space defined between the groundside surface of the housing and the opening means of the contaminant outlet port.

36. The filter unit of claim 33, wherein the housing further comprises a flush inlet in fluid communication with the cavity of the housing so that cleansing fluid way be introduced into the cavity for cleansing of the cavity of the housing, the wiper unit, and the filter element.

37. The filter unit of claim 23, further comprising:

a first pressure sensor attached to the housing and extending into the cavity of the housing for sensing the pressure of the unfiltered liquid within the cavity of the housing; and a second pressure sensor disposed in the flow path of the filtered fluid within the filtered fluid outlet port for sensing the pressure of the filtered liquid exiting the interior of the filter element so that contamination of the filter element can be sensed from an excessive or increasing pressure difference between the first pressure sensor and the second pressure sensor.

38. The filter unit of claim 23, wherein the annular flange of the housing has a plurality of flange orifices extending therein, and wherein the access plate has a plurality of access plate bores extending therethrough the access plate, the access plate bores complementarily spaced so that each plate bore is co-axial with one flange orifice when the access plate is detachably engaged to the annular flange of the housing, and further comprising a plurality of mechanical fasteners, each mechanical fastener having an exterior surface, wherein the flange orifice and a portion of the exterior surface of the mechanical fastener have complementary threaded surfaces, and wherein each mechanical fastener extends through a respective plate bore of the access plate collar and is detachable secured within a respective flange orifice.

* * * * *